United States Patent [19]

Bennett

[11] 4,442,149

[45] Apr. 10, 1984

[54] CABLE TENSION GLUING PROCESS

[76] Inventor: Garry K. Bennett, 1011 Grand St., Alameda, Calif. 94501

[21] Appl. No.: 257,940

[22] Filed: Apr. 27, 1981

[51] Int. Cl.[3] ........................... B32B 3/00; B32B 7/08

[52] U.S. Cl. ........................................ 428/53; 52/227; 52/565; 52/568; 144/349; 144/353; 144/354; 144/381; 156/92; 156/304.3; 156/304.5

[58] Field of Search ................. 52/222, 227, 562, 565, 52/568, 585; 144/309 B, 309 D, 309 Y, 316, 318, 345, 353, 349, 354, 359, 381; 156/91, 92, 304.3, 304.5; 428/52, 53, 223, 535

[56] References Cited

U.S. PATENT DOCUMENTS

| | | | |
|---|---|---|---|
| 693,915 | 2/1902 | Smith | 144/353 |
| 1,944,237 | 1/1934 | Heineman | 144/344 X |
| 3,144,892 | 8/1964 | Webster | 144/353 |

*Primary Examiner*—Robert A. Dawson

*Attorney, Agent, or Firm*—Robert Charles Hill

[57] ABSTRACT

The process for the gluing together of free form wood shapes in which individually pre-cut pieces are drawn into position, and correct, even, gluing pressure is applied by tension taken on a cable which has been routed internally through passages pre-drilled in component members of the finished shape and then connected at each ènd to take-up mechanisms which rest against the surface of the finished product.

8 Claims, 3 Drawing Figures

CABLE TENSION GLUING PROCESS

BACKGROUND OF THE INVENTION

The conventional method for providing curvature or radius to shapes constructed of wood or other materials bonded by adhesive is to use a gluing process in which adjacent pieces are edge screwed together to obtain proper gluing pressures or to employ a process in which a jig, mold, or other form is utilized in conjunction with powerful presses to squeeze laminations into the desired shape. Such methods require painstaking hand labor or large capital investment in order to produce complex shapes involving compound curves.

The present invention relates to a novel process for the gluing together of free form shapes which dispenses with the necessity for molds, forms, clamps, or presses.

SUMMARY OF THE INVENTION

Tensioning mechanisms are provided which consist of cables and take-up devices by which compression may be placed on the outer edges of shapes composed of individual members. Each member is precisely cut to occupy a specific position in the final product and each is so angled on its gluing edge that it pulls into place automatically as tension is applied.

In application, individual components of the shape are laid out in their proper relationships and plastic tubing is inserted through pre-aligned holes drilled in each member. A tensioning cable is then routed through the plastic tubing and attached at each end to a take-up device which bears against the outermost members of the shape. Glue or other adhesive is applied to glue surfaces and tension is taken on the cables to draw the shape into proper configuration and to apply correct and even gluing pressure which is maintained during the set up period for the adhesive. After the adhesive has set, tension is released and the cables are removed for re-use.

The take-up devices may be any type of ratchet, screw, overcenter cam, wedge, or other application. Proper alignment of each piece may be further facilitated by spline, tongue and groove, glue joint, or other reciprocal shaping of mating glue surfaces.

Desired shapes may be made up in lengths and cross sections then taken from the completed shape to accommodate volume production of the curved portions of wood furniture or of ornamental embellishments in architectural or other applications.

At all times during make-up and gluing, all exterior non-glue surfaces will be accessible for glue clean-up.

It is therefore an object of the present invention to provide a process for gluing together free form shapes composed of multiple pieces without the necessity for jigs, forms, or presses, through use of a cable tensioning mechanism where the cable is routed internally through the finished shape and attached at each end to a take-up mechanism which bears against the shape's surface.

It is yet another object of the present invention to provide a process whereby continuous lengths of a desired shape may be made up and cross sections taken therefrom for volume production of furniture, ornamental shapes, or other architectural applications.

And it is still another object of the present invention to provide a bonding process wherein exterior non-glue surfaces remain exposed during adhesive set up in order to facilitate glue clean-up.

The invention possesses other objects and advantages especially as concerns particular features and characteristics thereof which will become apparent as the specification continues.

DESCRIPTION OF THE PREFERRED EMBODIMENT

Figure 1:
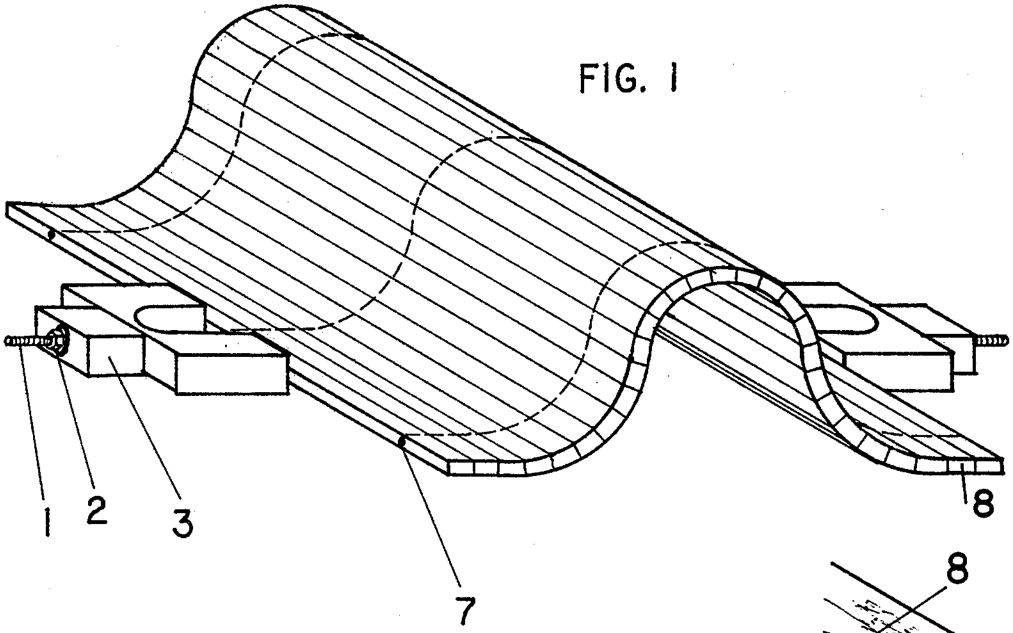
FIG. 1 is an oblique view of a finished wood shape having compound curvature with one cable tension gluing mechanism in place.
Figure 2:
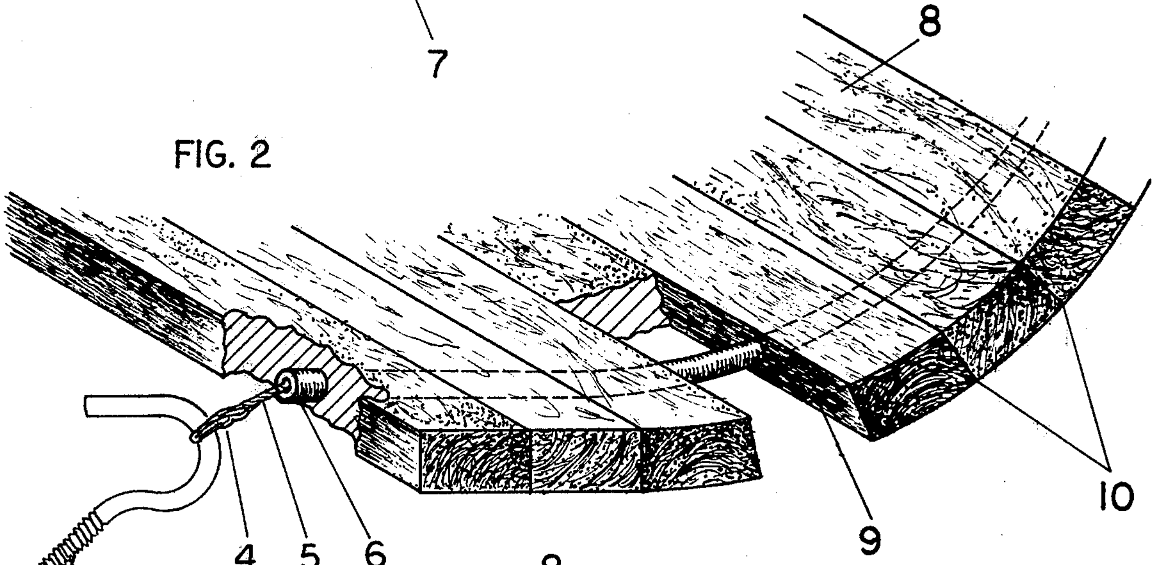
FIG. 2 is a detailed view of the cable assembly.
Figure 3:
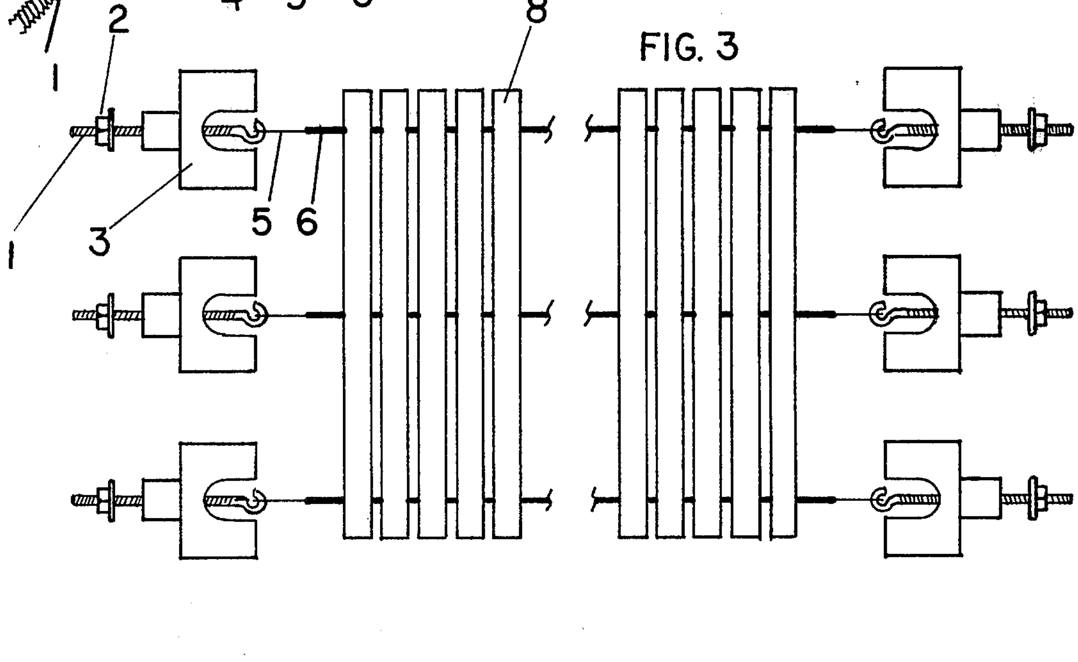
FIG. 3 is an exploded view of the invention in its entirety as it would appear prior to gluing and application of tension to the curved wood shape depicted in FIG. 1.

The cable tension mechanism as applied to manufacture a continuous length of a curved wood shape is depicted by FIG. 1. Included are individual wood members each exactly pre-cut for a specific position in the finished shape reference number 8, each member having pre-drilled holes 7, which are in alignment with those drilled in its next adjoining pieces so that plastic tubing 6 may be inserted to accommodate the tensioning cable 5. Each member may have provision along its edges for spline, glue joint or tongue and groove to assure proper alignment. The tensioning cable itself is affixed by loop 4 or clamp device at each end to a take-up mechanism which bears against the outer surface of the finished form. The take-up mechanisms may be composed of a "U" shaped yoke 3, and threaded hook 1, with take-up nut 2, although other methods may be employed to produce proper tension for correct and even glue pressures.

In operation, the pre-cut wood pieces 8 are laid out with pre-drilled holes 7 in close alignment. Plastic tubing 6 may be passed through the holes 7 if desired. The tensioning cable 5 is routed through the holes 7 or through the plastic tubing 6 if used. The cable 5 is attached to the threaded hook 1 in the take-up mechanism, leaving enough slack in the cable to provide access to glue surfaces 9. Glue is then applied to mating surfaces 9 and tension is taken on the cable as required to draw the form into shape and to apply proper and even clamping pressures to the glue joints 10. Excessive glue is cleaned from the exposed exterior of the shape. After the glue has set up, tension is released from the cable 1 and the cable 1 is then removed if tubing 6 has been used, or the cable 1 is clipped flush with the edges of the shape if no tubing 6 has been used. Cross sections may then be taken from the finished length as desired for use in fabricating furniture, ornamental designs, or other architectural applications.

While in the foregoing specifications embodiments of the invention have been set forth in considerable detail for purposes of making a complete disclosure of the invention, it will be apparent to those skilled in the art that numerous changes may be made in such details, as, for example, by using a tensioning filament other than cable or by utilizing cranked spools and ratchets or levers with overcenter cams as take-up mechanisms or in application of the process to align members for purposes other than gluing, without departing from the spirit and principles of the invention.

What is claimed is:

1. In a method for forming a predetermined curved shape from multiple pieces without the use of a jig, form or press, the steps comprising:

(a) forming the multiple pieces with opposite glue surfaces, (b) selecting an angular relationship for the glue surfaces of each piece to mate with glue surfaces of adjacent pieces and form the predetermined curved shape, (c) aligning internal passages extending between the glue surfaces of the respective pieces, (d) applying glue means to the glue surfaces, (e) routing a tensioning cable means through the aligned passages, (f) connecting tensioning devices at each end of the cable means for bearing against end pieces of the curved shape, and (g) applying tension to the cable means by the tensioning devices whereby the multiple pieces are drawn into the predetermined curved shape with pressure applied between adjacent glue surfaces.

2. The method of claim 1 wherein a plurality of aligned internal passages are formed through the multiple pieces, a tensioning cable means being routed through each of the plurality of aligned internal passages and similarly connected at its ends with tensioning devices.

3. The method of claim 1 wherein proper alignment of adjacent glue surfaces and strength of resulting glue joints are facilitated by forming reciprocally shaped mating surfaces on the adjacent glue surfaces.

4. The method of claim 1 wherein the tensioning cable means is routed through tubing means inserted through the aligned internal passages in the multiple members so that the cable means may be removed.

5. The method of claim 4 wherein cross sections are removed from the curved shape for use in mass production of products having curved components.

6. The method of claim 5 wherein a plurality of aligned internal passages are formed through the multiple pieces, a tensioning cable means being routed through each of the plurality of aligned internal passages and similarly connected at its ends with tensioning devices.

7. The method of claim 6 wherein the tensioning cable means is routed through tubing inserted through each of the plurality of aligned internal passages in the multiple members so that the cable means may be removed.

8. The product of the method of claims 4 or 5.

* * * * *